United States Patent
Stratton et al.

(10) Patent No.: US 9,889,631 B2
(45) Date of Patent: Feb. 13, 2018

(54) STRIP PROCESS AND COMPOSITION FOR MCRALY COATINGS AND A METHOD OF USING THE SAME

(71) Applicant: UNITED TECHNOLOGIES CORPORATION, Farmington, CT (US)

(72) Inventors: Eric W. Stratton, Mansfield, TX (US); Michael J. Minor, Arlington, TX (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 246 days.

(21) Appl. No.: 14/830,675

(22) Filed: Aug. 19, 2015

(65) Prior Publication Data

US 2016/0068968 A1 Mar. 10, 2016

Related U.S. Application Data

(60) Provisional application No. 62/048,045, filed on Sep. 9, 2014.

(51) Int. Cl.
| | | |
|---|---|---|
| *C03C 27/00* | (2006.01) |
| *B32B 15/01* | (2006.01) |
| *C23F 1/44* | (2006.01) |
| *C23F 1/28* | (2006.01) |

(52) U.S. Cl.
CPC ............ *B32B 15/01* (2013.01); *B32B 15/013* (2013.01); *B32B 15/015* (2013.01); *C23F 1/28* (2013.01); *C23F 1/44* (2013.01)

(58) Field of Classification Search
CPC ............... C23F 1/20; C23F 1/44; B32B 15/01
USPC ......................................................... 428/632
See application file for complete search history.

(56) References Cited

U.S. PATENT DOCUMENTS

| | | | | |
|---|---|---|---|---|
| 3,448,055 A | * | 6/1969 | Mickelson | ............. C23G 1/125 134/3 |
| 2013/0053292 A1 | * | 2/2013 | Stratton | .................... C23F 1/44 510/202 |

* cited by examiner

*Primary Examiner* — Hui Chin
(74) *Attorney, Agent, or Firm* — Cantor Colburn LLP (57) ABSTRACT

The present disclosure relates generally to strip process for removing a coating from a substrate comprising the steps of: providing a base alloy and a MCrAlY coating deposited over the base alloy substrate; and removing the MCrAlY coating by bringing the MCrAlY coating in contact with an acid solution comprising nitric acid, phosphoric acid and ammonium bifluoride in an aqueous solution, and maintaining the acid solution contact for sufficient time and at sufficient temperature to permit the coating to be stripped from the base alloy substrate.

16 Claims, 7 Drawing Sheets

STRIP PROCESS AND COMPOSITION FOR MCRALY COATINGS AND A METHOD OF USING THE SAME

CROSS REFERENCE TO RELATED APPLICATION

This application claims the benefit of and incorporates by reference herein the disclosure of U.S. Ser. No. 62/048,045, filed Sep. 9, 2014.

TECHNICAL FIELD OF THE DISCLOSED EMBODIMENTS

The present disclosure is generally related to a process for removing a MCrAlY coating from a substrate made from an alloy.

BACKGROUND OF THE DISCLOSED EMBODIMENTS

Cast base alloys used in turbine engine components can be coated with MCrAlY type overlay coatings that typically contain about 8-12% aluminum. These coatings extend the life of the components that they are applied to.

During manufacturing rework or aftermarket repair, coatings are removed using mineral acids. Typically 70-100 v/o hydrochloric acid is used to remove MCrAlY type coatings, which acid leaches preferentially the aluminum in coatings containing relatively elevated levels of aluminum, but does not attack the base alloy which contains much lower levels of aluminum. On a significant number of coating and base alloy systems, the mineral acids used preferentially attack the coating without significant chemical attack or corrosion of the base alloys. The intended result is that the coating is removed without damaging the part.

In addition, the use of hydrochloric acid gives rise to concerns over workplace and external emissions for which emissions and permitting standards have been developed. Accordingly, it would be desirable to be able to provide a coating strip process to remove MCrAlY type coatings while eliminating the use of chloride-based stripping compositions, while achieving at least the same efficacy and efficiency as that achieved with chloride-based stripping compositions and methods.

Improvements in the methods of stripping of superalloys are therefore needed in the art.

SUMMARY OF THE DISCLOSED EMBODIMENTS

In one embodiment a strip process is disclosed for removing a coating from a substrate comprising the steps of: placing a MCrAlY coating deposited over a base alloy substrate in contact with an effective amount of an acid solution comprising nitric acid, phosphoric acid and ammonium bifluoride in an aqueous solution; and maintaining the acid solution at a temperature in the range of from about 140 to 160 degrees Fahrenheit for sufficient contact time to permit the coating to be stripped from the alloy.

In a further embodiment of the above, the acidic component of the acid solution consists essentially of nitric acid, phosphoric acid and ammonium bifluoride as active ingredients.

In a further embodiment of any of the above, the acid solution is substantially free of any chloride-based chemicals or acids.

In a further embodiment of any of the above, the acid solution comprising 12 to 16% by volume nitric acid, comprising 3 to 7% by volume phosphoric acid and comprising 16 to 20% mass/volume ammonium bifluoride, the balance being water.

In a further embodiment of any of the above, the MCrAlY coating is subject to a series of de-smutting blasts during the contact time.

In a further embodiment of any of the above, the acid solution is maintained in contact with the MCrAlY coating by spraying.

In a further embodiment of any of the above, the acid solution is maintained in contact with the MCrAlY coating by immersion.

In a further embodiment of any of the above, the acid solution is maintained in contact with the MCrAlY coating for a time period less than about 4 hours.

In a further embodiment of any of the above, the base alloy is selected from the group consisting of: a nickel-base alloy, a cobalt-base alloy, and an iron-base alloy.

In another embodiment, a strip process is disclosed for removing a coating from a substrate comprising the steps of: providing a base alloy substrate and a MCrAlY coating deposited over the base alloy substrate; and removing the MCrAlY coating by contacting the MCrAlY coating with an acid solution comprising 12 to 16% by volume nitric acid, comprising 3 to 7% by volume phosphoric acid and comprising 16 to 20% mass/volume ammonium bifluoride, the balance being water; and maintaining the acid solution at a temperature in the range of from about 140 to 160 degrees Fahrenheit for sufficient contact time to permit the MCrAlY coating to be stripped from the base alloy substrate, wherein the MCrAlY coating is subject to a series of de-smutting blasts during the contact time.

In another embodiment, a base alloy bearing a MCrAlY coating prepared for stripping the MCrAlY coating is disclosed, the MCrAlY coating in contact with an effective amount of an acid solution comprising nitric acid, phosphoric acid and ammonium bifluoride in an aqueous solution.

In a further embodiment of the above, the acidic component of the acid solution consists essentially of nitric acid, phosphoric acid and ammonium bifluoride as active ingredients.

In a further embodiment of any of the above, the acid solution is substantially free of any chloride-based chemicals or acids In a further embodiment of any of the above, the acid solution comprising 12 to 16% by volume nitric acid, comprising 3 to 7% by volume phosphoric acid and comprising 16 to 20% mass/volume ammonium bifluoride, the balance being water.

In a further embodiment of any of the above, the MCrAlY coating being immersed in an effective amount of an acid solution comprising nitric acid, phosphoric acid and ammonium bifluoride in an aqueous solution.

In a further embodiment of any of the above, the acidic component of the acid solution consists essentially of nitric acid, phosphoric acid and ammonium bifluoride as active ingredients.

In a further embodiment of any of the above, the acid solution is substantially free of any chloride-based chemicals or acids.

In a further embodiment of any of the above, the acid solution comprising 12 to 16% by volume nitric acid, comprising 3 to 7% by volume phosphoric acid and comprising 16 to 20% mass/volume ammonium bifluoride, the balance being water.

In a further embodiment of any of the above, the base alloy is selected from the group consisting of: a nickel-base alloy, a cobalt-base alloy, and an iron-base alloy.

Other embodiments are also disclosed.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In one aspect, the presently disclosed embodiments include a method to remove MCrAlY coatings from a base alloy (such as a nickel-, cobalt- or iron-based alloy), such as is necessary for gas turbine engine overhaul and OEM manufacture recycling. The presently disclosed embodiments include a beneficial method of chemical removal of MCrAlY coatings that achieves equivalent or better results compared to prior methods, without damaging the substrate and without the risks attendant to use of chloride-based stripping formulations.

In one embodiment, a strip process is disclosed for removing a coating from a substrate comprising the steps of: providing a base alloy substrate and a MCrAlY coating deposited over the base alloy substrate; and removing the MCrAlY coating by contacting the base alloy substrate in an acid solution comprising nitric acid, phosphoric acid and ammonium bifluoride in an aqueous solution; and maintaining the acid solution at a temperature in the range of from about 140 to 160 degrees Fahrenheit for sufficient contact time to permit the MCrAlY coating to be stripped from the base alloy substrate. In application, this solution may be applied with agitation in air in some embodiments.

In one embodiment, the acid solution may comprise 12 to 16% by volume nitric acid, comprising 3 to 7% by volume phosphoric acid and comprising 16 to 20% mass/volume ammonium bifluoride, the balance being water. In one embodiment, the acidic component of the acid solution may consist essentially of nitric acid, phosphoric acid and ammonium bifluoride as active ingredients, and also be substantially free of any chloride-based chemicals or acids.

In some embodiments, the treated MCrAlY coating is subjected to a series of de-smutting blasts or other physical dislodgement processes, during the contact time, and in some embodiments temporally distributed, to bring about effective and efficient removal of the coating.

In some embodiments, the strip process may be carried out by having the acid solution maintained in contact with the MCrAlY coating by any effective method, such as by spraying, by immersion, or combination thereof.

The sufficient contact time to permit the coating to be stripped from the alloy is in some embodiments a time period less than about 4 hours under standard treatment temperatures, with some embodiments including treatment times in a range from about 2 to about 4 hours.

The disclosed embodiments also include any article of a base alloy and bearing a MCrAlY coating prepared for stripping the coating, the MCrAlY coating in contact with an effective amount of nitric acid, phosphoric acid and ammonium bifluoride in an aqueous solution. Also included in the disclosed embodiments is an article of a base alloy bearing a MCrAlY coating prepared for stripping the MCrAlY coating, the MCrAlY coating being immersed in, or under the spray of, an effective amount of nitric acid, phosphoric acid and ammonium bifluoride in an aqueous solution.

FIGS. 1-6 are sequential photomicrographs showing the surface of a nickel-base alloy material bearing a MCrAlY coating as it is subjected to treatment with the stripping composition over time in one embodiment, and subjected to periodic de-smut grit blasts during that time. These figures elucidate only one embodiment of the method, and it will be appreciated that similar results may be obtained with somewhat shorter or longer overall treatment times and/or with somewhat fewer or additional de-smutting blasts, as may be appreciated by one of ordinary skill in the art in view of this disclosure. As the figures elucidate, the extent of MCrAlY coating removal and the associated preservation of the alloy surface may be measured and monitored to achieve the desired results.

Figure 1:
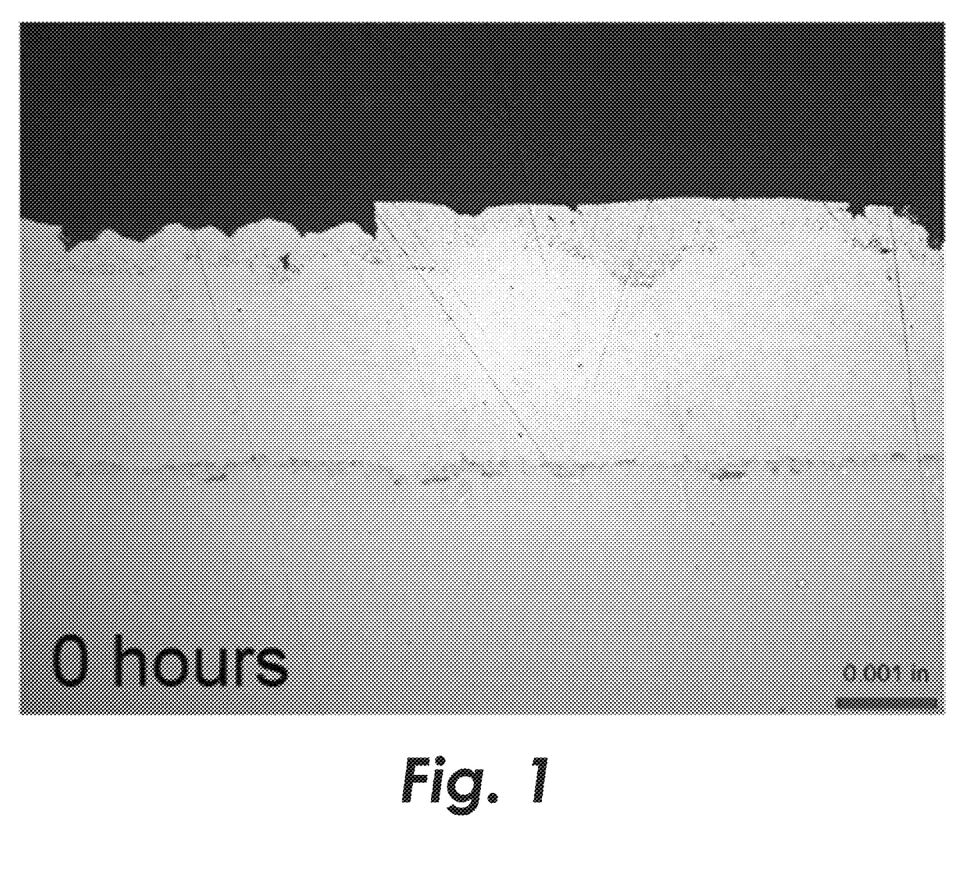
FIG. 1 is a photomicrograph showing the surface of an alloy material and showing the nature of the surface prior to stripping with a composition in one embodiment.

FIG. 1 is a photomicrograph showing the surface of a nickel-base alloy material bearing a MCrAlY coating and showing the nature of the surface prior to stripping the MCrAlY coating with a composition of one embodiment, and practicing one embodiment of the associated method.

Figure 2:
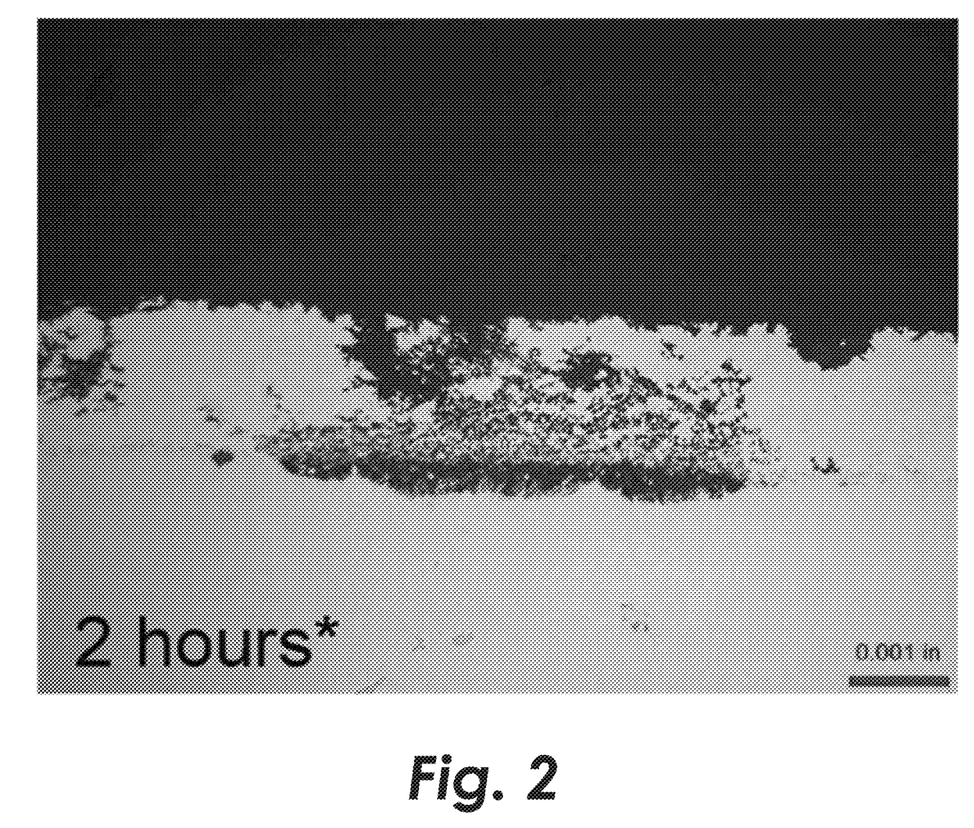
FIG. 2 is a photomicrograph showing the surface of an alloy material and showing the nature of the surface stripping with a composition in accordance with one embodiment, and at two hours into the treatment with the stripping composition, and immediately prior to a subsequent de-smut grit blast.

FIG. 2 is a photomicrograph showing the surface of the nickel-base alloy material bearing a MCrAlY coating and showing the nature of the surface as it is being stripped with the stripping composition in accordance with one embodiment, at two hours into the treatment with the stripping composition, and prior to a first de-smut grit blast, the results at which point reflected in the first row of the table below.

Figure 3:
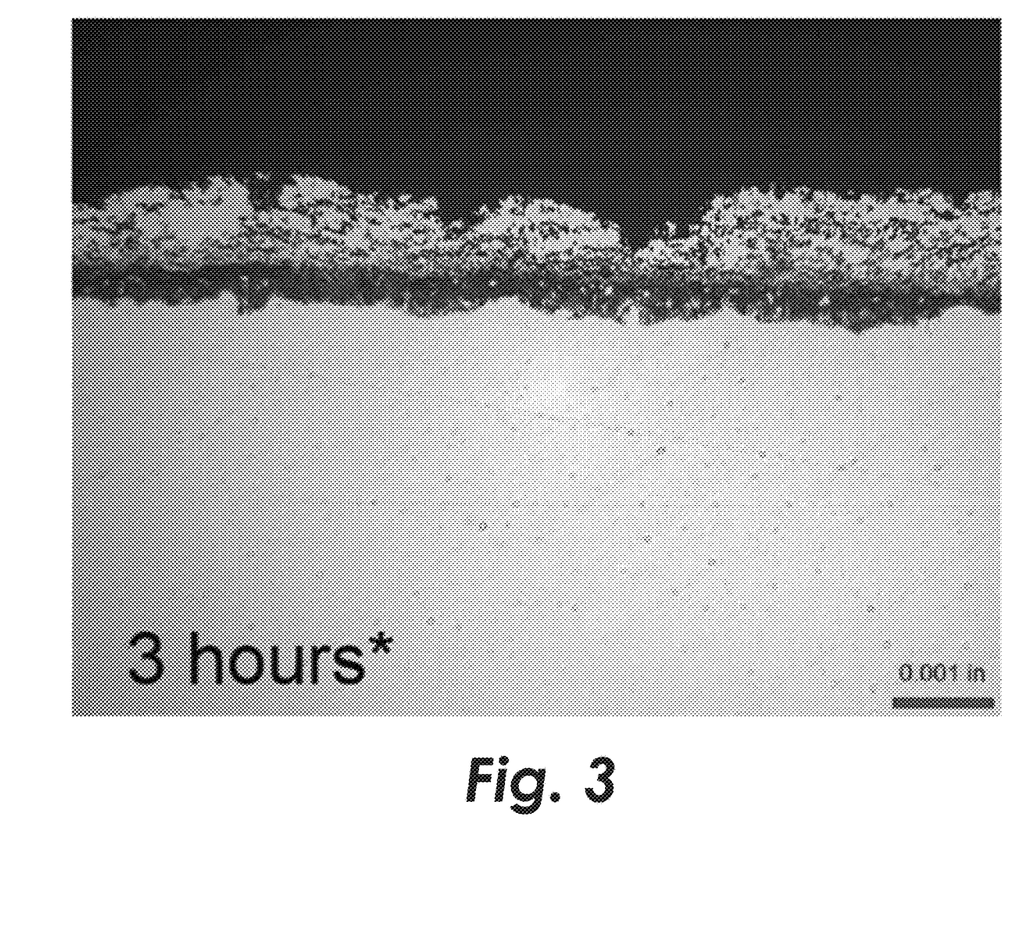
FIG. 3 is a photomicrograph showing the surface of an alloy material and showing the nature of the surface stripping with a composition in accordance with one embodiment, and at three hours into the treatment with the stripping composition, and immediately prior to a subsequent de-smut grit blast.

FIG. 3 is a photomicrograph showing the surface of the nickel-base alloy material bearing a MCrAlY coating and showing the nature of the surface as it is being stripped with the stripping composition in accordance with one embodiment, at three hours into the treatment with the stripping composition, and prior to a first de-smut grit blast after which the results are reflected in the second row of the table below.

Figure 4:
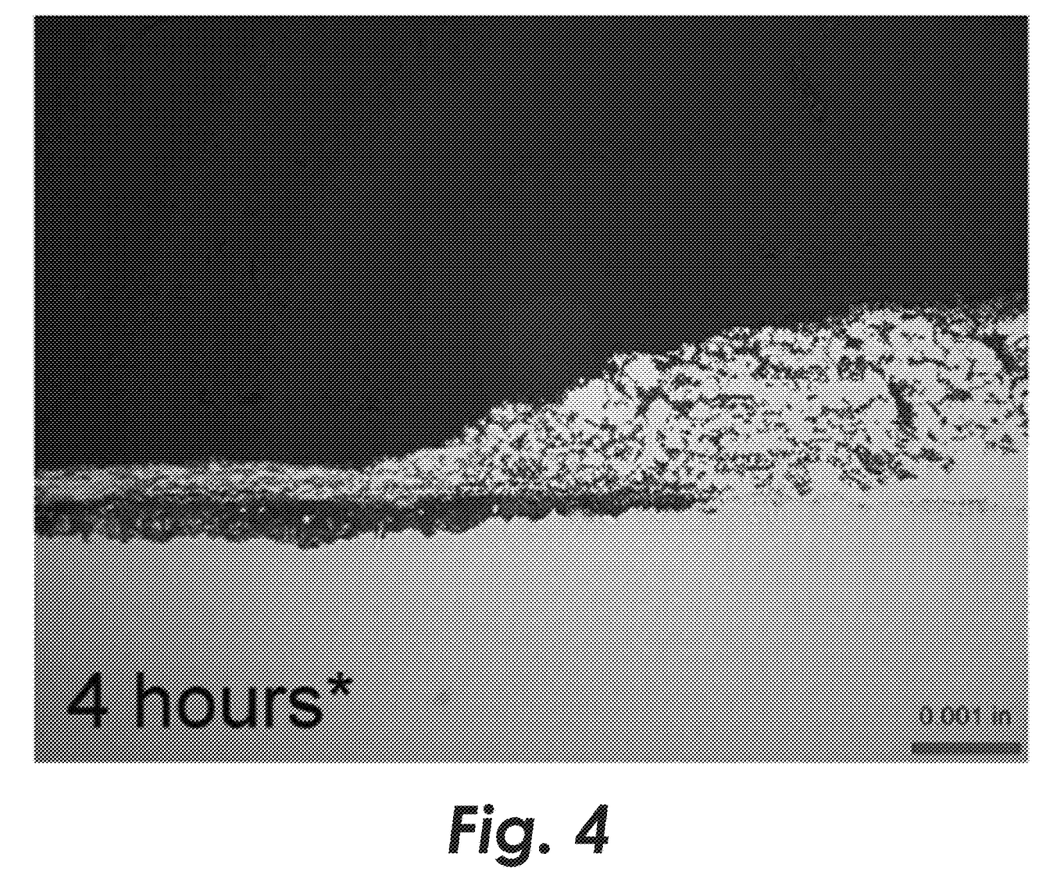
FIG. 4 is a photomicrograph showing the surface of an alloy material and showing the nature of the surface stripping with a composition in accordance with one embodiment, and at four hours into the treatment with the stripping composition, and immediately prior to a subsequent de-smut grit blast.

FIG. 4 is a photomicrograph showing the surface of the nickel-base alloy material bearing a MCrAlY coating and showing the nature of the surface as it is being stripped with the stripping composition in accordance with one embodiment, at four hours into the treatment with the stripping composition, and prior to a second de-smut grit blast after which the results are reflected in the third row of the table below.

Figure 5:
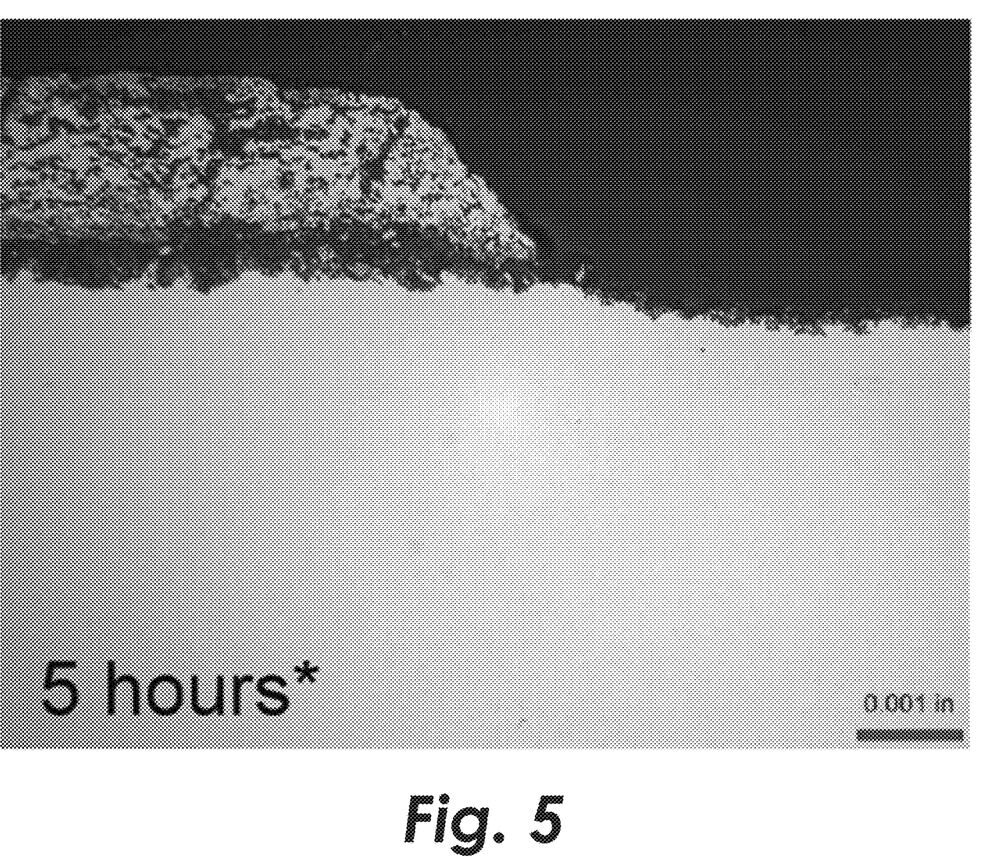
FIG. 5 is a photomicrograph showing the surface of an alloy material and showing the nature of the surface stripping with a composition in accordance with one embodiment, and at five hours into the treatment with the stripping composition, and immediately prior to a subsequent de-smut grit blast.

FIG. 5 is a photomicrograph showing the surface of the nickel-base alloy material bearing a MCrAlY coating and showing the nature of the surface as it is being stripped with the stripping composition in accordance with one embodiment, at five hours into the treatment with the stripping composition, and prior to a third de-smut grit blast after which the results are reflected in the fourth row of the table below.

Figure 6:
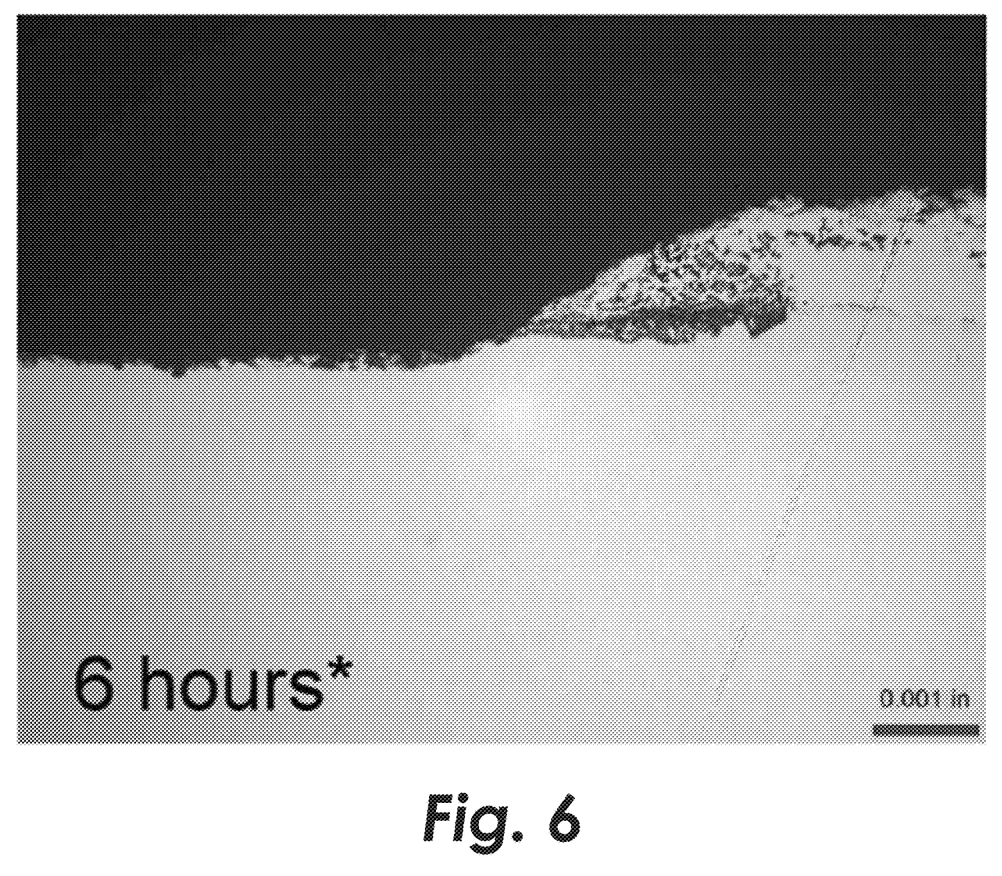
FIG. 6 is a photomicrograph showing the surface of an alloy material and showing the nature of the surface stripping with a composition in accordance with one embodiment, and at six hours into the treatment with the stripping composition, and immediately prior to a subsequent de-smut grit blast.

FIG. 6 is a photomicrograph showing the surface of the nickel-base alloy material bearing a MCrAlY coating and showing the nature of the surface as it is being stripped with the stripping composition in accordance with one embodiment, at six hours into the treatment with the stripping composition, and prior to a fourth de-smut grit blast after which the results are reflected in the fifth row of the table below.

Figure 7:
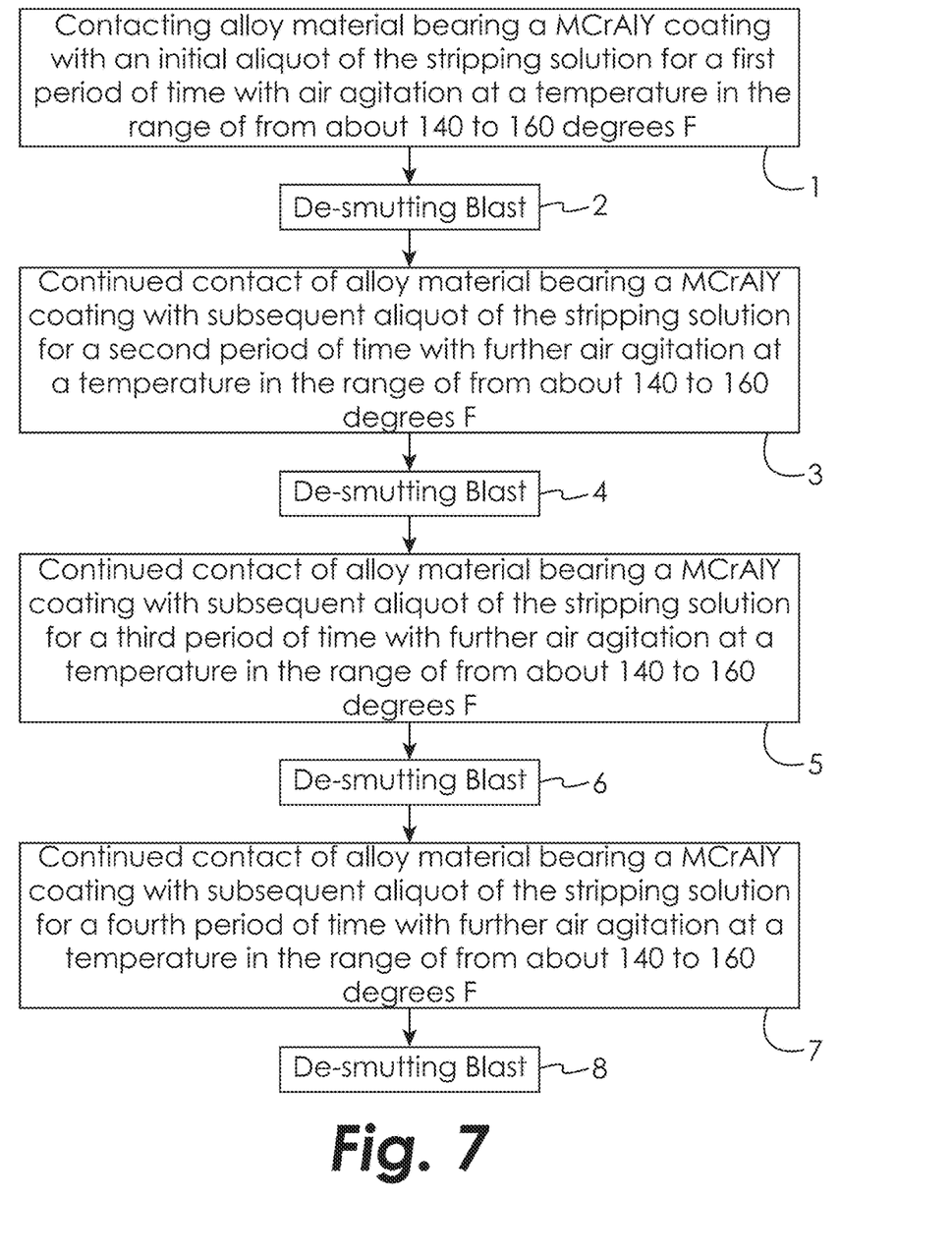
FIG. 7 is a schematic flow diagram of the steps of one embodiment method.

FIG. 7 is a schematic flow diagram of the steps of one embodiment of the present invention. FIG. 7 shows the steps of the method the results of which may be elucidated in FIGS. 1-6 and for which the results are reflected in the table below. FIG. 7 shows the first step 1 of contacting the alloy material bearing a MCrAlY coating with an first aliquot of the stripping solution for a first period of time (e.g., 3 hours) under air agitation and at a temperature sufficient to allow the stripping solution to act upon the MCrAlY coating allowing it to be stripped (e.g, at a temperature in the range of from about 140 to 160 degrees Fahrenheit) which is then followed by a de-smutting blast 2 to remove loosened coating material. These steps may then be followed by further optional steps that may include contact of alloy material bearing a MCrAlY coating with subsequent aliquots of the stripping solution, such as for additional periods of time (e.g., 1 hour each), with further air agitation and while maintained at a temperature sufficient to allow the stripping solution to act upon the MCrAlY coating allowing it to be stripped (e.g, at a temperature in the range of from about 140 to 160 degrees Fahrenheit); and accompanied by intermittent de-smutting blasts as referred to in steps 3-8 of FIG. 7, as may be required to achieve the degree of stripping desired. It will be appreciated from the tabulated results below that, within a relatively short period of time, the coating was able to be substantially or completely stripped away with comparatively little attack upon the underlying alloy surface.

Nitric Acid, Phosphoric Acid and Ammonium Bifluoride (NPAB) Results

| Temp | Strip Time | Agitation Type | De-Smut Grit Blasts | Coating Thickness | Coating Remaining | Alloy Attack - Avg (mil) | Alloy Attack - Spikes (mil) | Stripped Successfully |
|---|---|---|---|---|---|---|---|---|
| 140-160 F. | 2 hrs | Air | 0 | 2.0 mil | 1.5 mil | 0 mil | 0 mil | No |
| 140-160 F. | 3 hrs | Air | 1 | 2.0 mil | 1.0 mil | 0 mil | 0 mil | No |
| 140-160 F. | 4 hrs | Air | 2 | 2.1 mil | 0 mil | 0.5 mil | 0.4 mil | Yes |
| 140-160 F. | 5 hrs | Air | 3 | 1.7 mil | 0 mil | 0.5 mil | 0.6 mil | Yes |
| 140-160 F. | 6 hrs | Air | 4 | 2.0 mil | 0 mil | 1.0 mil | 0.6 mil | Yes |

The efficacy and efficiency of a stripping process may be expressed in terms of coating removal over time with attendant preservation of the underlying base alloy.

The above-tabulated results demonstrate that, after 4 hours at 140-160 F, nickel-base alloy test samples were completely stripped of MCrAlY coating through use of a method in accordance with one embodiment. These results were achieved with comparatively minimal attack on the underlying nickel-base alloy; an additional 1-hour immersion is possible without significant attack (i.e., >approximately 0.5 mil).

As may be appreciated from the above results, complete removal of diffused MCrAlY coatings on base alloys was achieved without damaging the underlying substrate, and without the need for use of chloride-based acids or other chemical species.

The presently disclosed embodiments thus provide a relatively safe chemical composition of the solution while achieving results that are at least the same as if not superior to chloride-based stripping solutions, as typical chloride-based stripping methods typically require treatment times on the order of four hours while the test results reported herein describe safe and effective MCrAly removal within approximately 2-3 hours in some embodiments, optionally aided by a series of associated de-smutting grit blasts.

The method of the disclosed embodiments may be applied in aftermarket applications as well as OEM manufacturing for in-process recycling.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A strip process for removing a coating from a substrate comprising the steps of: placing a MCrAlY coating deposited over a base alloy substrate in contact with an effective amount of an acid solution; and maintaining said acid solution at a temperature in the range of from about 140 to 160 degrees Fahrenheit for sufficient contact time to permit said coating to be stripped from said alloy, wherein the acidic component of said acid solution consists essentially of nitric acid, phosphoric acid and ammonium bifluoride as active ingredients.

2. A strip process according to claim 1 wherein said acid solution is substantially free of any chloride-based chemicals or acids.

3. A strip process according to claim 1 wherein said acid solution comprising water and the acid component which consists essentially of 12 to 16% by volume nitric acid, 3 to 7% by volume phosphoric acid and 16 to 20% mass/volume ammonium bifluoride, the balance being water.

4. A strip process according to claim 1 wherein said MCrAlY coating is subject to a series of de-smutting blasts during said contact time.

5. A strip process according to claim 1 wherein said acid solution is maintained in contact with said MCrAlY coating by spraying.

6. A strip process according to claim 1 wherein said acid solution is maintained in contact with said MCrAlY coating by immersion.

7. A strip process according to claim 1 wherein said acid solution is maintained in contact with said MCrAlY coating for a time period less than about 4 hours.

8. A strip process according to claim 1 wherein the base alloy is selected from the group consisting of: a nickel-base alloy, a cobalt-base alloy, and an iron-base alloy.

9. A strip process for removing a coating from a substrate comprising the steps of: providing a base alloy substrate and a MCrAlY coating deposited over said base alloy substrate; and removing said MCrAlY coating by contacting said MCrAlY coating with an acid solution comprising 12 to 16% by volume nitric acid, comprising 3 to 7% by volume phosphoric acid and comprising 16 to 20% mass/volume ammonium bifluoride, the balance being water; and maintaining said acid solution at a temperature in the range of from about 140 to 160 degrees Fahrenheit for sufficient contact time to permit said MCrAlY coating to be stripped from said base alloy substrate, wherein said MCrAlY coating is subject to a series of de-smutting blasts during said contact time.

10. A base alloy bearing a MCrAlY coating prepared for stripping said MCrAlY coating, said MCrAlY coating in contact with an effective amount of an acid solution wherein the acidic component of said acid solution consists essentially of nitric acid, phosphoric acid and ammonium bifluoride as active ingredients.

11. A base alloy bearing a MCrAlY coating according to claim 10 wherein said acid solution is substantially free of any chloride-based chemicals or acids.

12. A base alloy bearing a MCrAlY coating according to claim 10 wherein said acid solution comprising water and the acid component which consists essentially of 12 to 16% by volume nitric acid, 3 to 7% by volume phosphoric acid and 16 to 20% mass/volume ammonium bifluoride, the balance being water.

13. A base alloy bearing a MCrAlY coating prepared for stripping said MCrAlY coating, said MCrAlY coating being immersed in an effective amount of an acid solution wherein the acidic component of said acid solution consists essentially of nitric acid, phosphoric acid and ammonium bifluoride as active ingredients.

14. A base alloy bearing a MCrAlY coating according to claim 13 wherein said acid solution is substantially free of any chloride-based chemicals or acids.

15. A base alloy bearing a MCrAlY coating according to claim 13 wherein said acid solution comprising water and the add component which consists essentially of 12 to 16% by volume nitric acid, 3 to 7% by volume phosphoric acid and 16 to 20% mass/volume ammonium bifluoride, the balance being water.

16. A base alloy bearing a MCrAlY coating according to claim 10 wherein the base alloy is selected from the group consisting of: a nickel-base alloy, a cobalt-base alloy, and an iron-base alloy.

* * * * *